United States Patent [19]

Hirata et al.

[11] Patent Number: 4,904,310
[45] Date of Patent: Feb. 27, 1990

[54] METHOD OF GENERATING A METAL VAPOR IN A METAL VAPOR LASER

[75] Inventors: Kenji Hirata; Hideki Ninomiya; Shigetoshi Yoshino; Hiromu Inoue, all of Matsuyama; Jue Mizutani, Takamatsu, all of Japan

[73] Assignee: Shikoku Research Institute Incorporated, Yashimanishi, Japan

[21] Appl. No.: 236,880

[22] Filed: Aug. 26, 1988

[30] Foreign Application Priority Data

Aug. 28, 1987 [JP] Japan .................................. 62-214276

[51] Int. Cl.$^4$ .............................................. B23K 9/00
[52] U.S. Cl. ...................................... 148/4; 148/903; 219/121.66
[58] Field of Search ............. 148/4, 903; 219/121 LE, 219/121 LM, 121.65, 121.66

[56] References Cited

U.S. PATENT DOCUMENTS 4,122,240 10/1978 Banas et al. ........................ 148/903

OTHER PUBLICATIONS

"Investigation of Pulsed Lasing in Iron Vapor", by V. D. Divin et al., Sov. J. Quantum Electron, 5/1984, pp. 700–702.

"6C3-Efficient Pulsed Gas Discharge Lasers", by W. T. Walter et al., IEEE Journal of Quantum Electronics, vol. QE-2, No. 9, 9/66, pp. 474–479.

"Copper Vapor Laser", by Zhen–Guo Huang et al., Japan Laser Academic Society, 3/81, pp. 60–66 (with English translation).

*Primary Examiner*—S. Kastler
*Attorney, Agent, or Firm*—Fleit, Jacobson, Cohn, Price, Holman & Stern

[57] ABSTRACT

A method of irradiating a metal piece (5) with a laser beam for generating a metal vapor (11) required for a metal vapor laser to oscillate. The method makes it possible to reduce the time required to activate the laser as well as the response time required to adjust the metal vapor density. Metals having a high melting point can also be vaporized for laser oscillation in accordance with the method.

4 Claims, 2 Drawing Sheets

METHOD OF GENERATING A METAL VAPOR IN A METAL VAPOR LASER

BACKGROUND OF THE INVENTION

The present invention relates to a method of generating a metal vapor in a metal vapor laser by means of another laser.

A prior art metal vapor laser shown in FIG. 3 comprises a laser discharge tube 1 having sealed therein a buffer gas such as helium. Within the discharge tube 1, a solid piece of metal 5 located in a metal reservoir 3 is heated, melted and vaporized by a heating element 9 of a heater 7. A sufficiently high voltage is applied a heater 7. A sufficiently high voltage is applied between a pair of electrodes 15 and 17 provided on both sides of the metal reservoir 3 within the tube 1, whereby electric discharge occurs which will excite the thus vaporized metal atoms. The thus excited metal atoms will give off energy in the form of light or photons by a process of chain stimulated emission. A beam of the thus generated coherent photons is increasingly intensified while being repeatedly reflected by concave mirrors 19 and 21 provided outside the tube 1 at both ends thereof facing toward each other. An output metal vapor laser beam will emerge from one of the concave mirrors 21.

There are the following problems with such a prior art laser:

(a) Since the metal reservoir, the metal piece in it, and the heater have a relatively large heat capacity, it takes a relatively long time to vaporize the metal by heating it.

(b) For the same reason, the response is relatively slow when the temperature of the metal piece should be changed to adjust the density of the metal vapor.

(c) Where a metal is vaporized which has a melting point of higher than about 1300° C. and is difficult to vaporize, there is a problem of the heat resistance of some elements, such as the metal reservoir and the discharge tube. Thus, it is difficult to produce metal vapor lasers in which metals of high melting points are to be used as the oscillating medium.

SUMMARY OF THE INVENTION

The present invention has been made in an attempt to solve the above problems, and an object of the invention is to provide a method of generating a metal vapor in a metal vapor laser, which makes it possible to produce quick-response metal vapor lasers as well as metal vapor lasers using metals having a high melting point, such as iron.

In accordance with the present invention, the above object is achieved by the method of generating a metal vapor which is to act as the oscillating medium in a metal vapor laser, which provides that the heating of the metal to be vaporized should be performed by means of a laser instead of an electric heater used in the prior art apparatus, that the ability of the laser beam to be capable of being condensed should be utilized to achieve a local heating of the metal for vaporization.

DESCRIPTION OF THE PREFERRED EMBODIMENTS

The present invention will now be described with reference to the above-described figures of the accompanying drawings. The scope of the invention however is not limited by the drawings.

Figure 3:
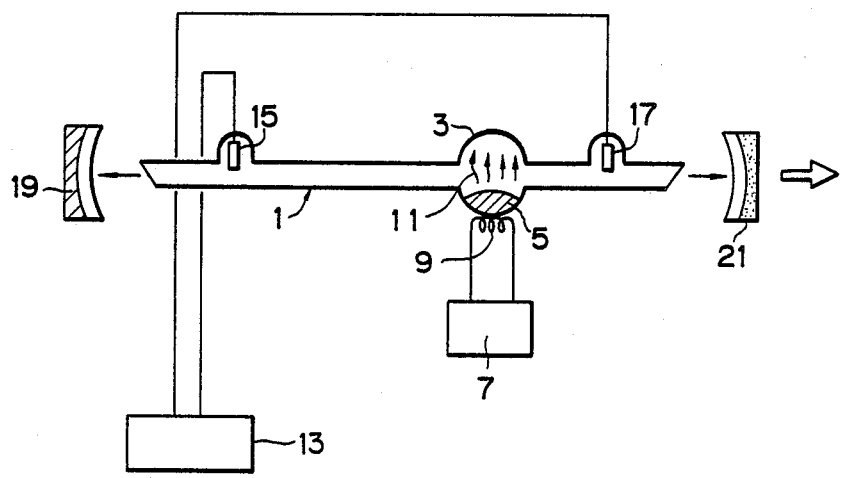
FIG. 3 is a schematic diagram showing a prior art metal vapor generator.

In the drawings, identical or equivalent parts or elements shown indifferent figures of the drawings are designated by the same reference numerals, and those parts or elements which have already been described in connection with the prior art apparatus shown in FIG. 3 will not be described again.

Figure 1:
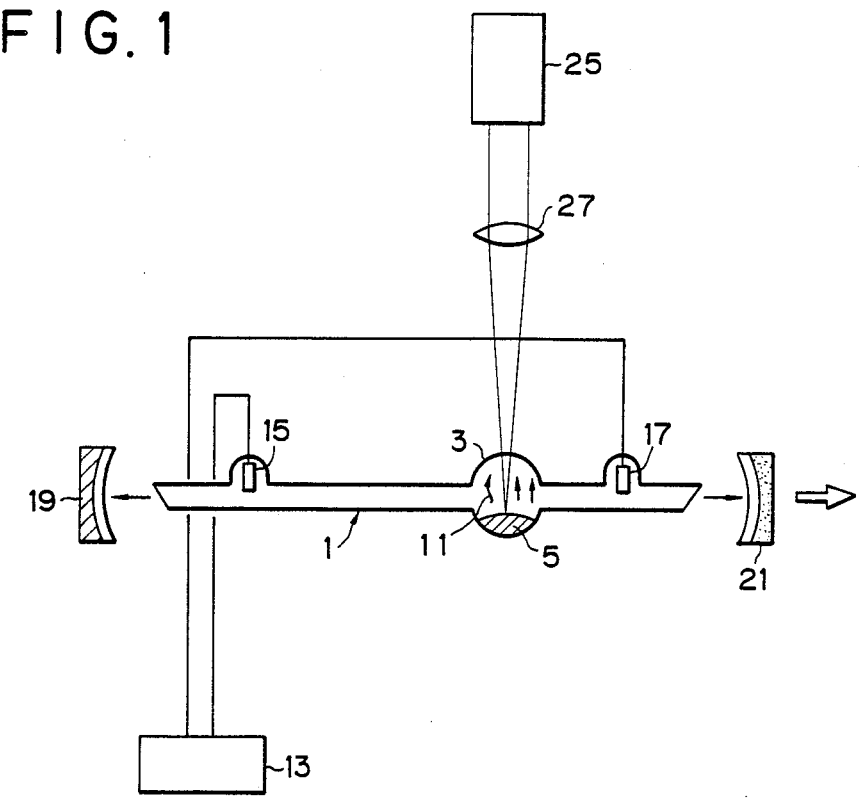
FIG. 1 is a schematic diagram showing an example of the apparatus to implement the method according to the present invention.

FIG. 1 shows an example of the apparatus to implement the method according to the present invention.

The difference from the prior art lies in that a metal piece 5 in a metal reservoir 3 is heated by a laser beam emitted from a laser, particularly a high-power laser, such as a YAG (yttrium-aluminium-garnet) laser, carbon dioxide gas laser, glass laser, nitrogen laser, or excimer laser, instead of the heating element 7 of the electric heater 9. The high-power laser 25 is provided at a position where it can direct a laser beam to the metal piece 5 within the reservoir 3, and a condenser optical system 27 in the form of a convex lens, for example, is provided between them for condensing the high power laser beam. The condenser system 27 is positioned such as to have a focus at a location proximate to the surface of the metal piece 5, whereby the laser beam emitted from the high-power laser 25 is concentrated through the metal vapor laser discharge tube wall to a point on the metal piece surface 5. The metal piece 5 is thus immediately heated to melt and the required metal vapor is thus generated.

The material of the metal piece for vaporization may be one of various metals such as copper, gold, manganese, lead, calcium, barium, strontium, iron, nickel, cobalt and titanium, or may be a combination of these metals.

Figure 2:
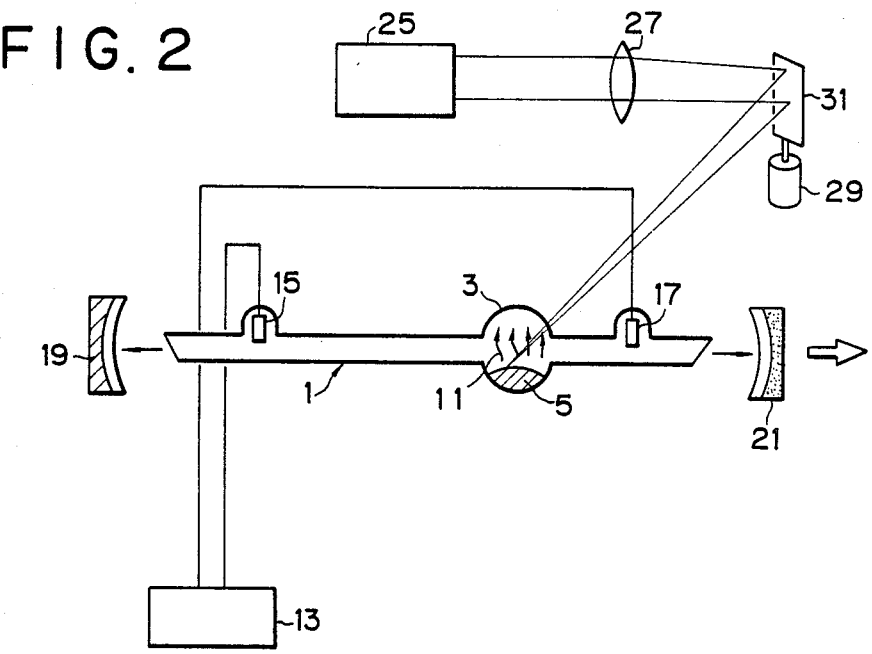
FIG. 2 is a schematic diagram showing another example of the apparatus to implement the method according to the present invention, in which a scanning device is provided.

A hole is formed and grown due to the vaporization during operation, and thus the metal surface becomes out of focus. Further, the latent heat of the vapor may deteriorate the efficiency. Therefore, the condenser system 27 must be moved so as to move the focus to a suitable new position where the metal can efficiently be vaporized. The condenser system 27 may be moved in the direction of the optical axis. Alternatively, a scanning device 29 may be provided between the condenser system 27 and the metal reservoir 3 as shown in FIG. 2. In the second embodiment shown in FIG. 2, a mirror 31 of the scanning device is rotated to continuously move the focus position, whereby the location where vaporization of the metal occurs is continuously changed. The density of the metal vapor thus generated can be adjusted by changing the intensity of the laser beam or by periodically interrupting the irradiation. A more powerful laser beam should be applied when the metal to be vaporized has a higher melting point or when the metal vapor should have a higher density.

Examples of the scanning device 29 include a galvanometer scanner having a movable mirror for scanning shown in FIG. 2, a polygon mirror scanner having a polygonal mirror for scanning, and a supersonic deflector having an A/O deflector for scanning.

Next, a high voltage is applied between the electrodes 15 and 17 within the metal vapor laser discharge tube 1 having sealed therein a buffer gas such as helium, neon, argon, krypton, or xenon. Discharge is initiated by the high voltage, which will excite the metal atoms within the tube, whereby metal (e.g. copper) vapor laser light is obtained from both ends of the tube. The intensity of the metal vapor laser light is increased while being repeatedly reflected by the concave mirrors 19 and 21, and part of the thus intensified laser light will pass through one of the mirrors 21. Where the intensifying operation by means of the concave mirrors 19 and 21 is not necessitated, the mirrors 19 and 21 are not provided and the laser light from both ends of the metal vapor laser discharge tube 1 may immediately be used.

EFFECT

The method of generating a metal vapor according to the present invention can provide improvements in the operation of metal vapor lasers in that it takes little time to activate a metal vapor laser in accordance with the method of the invention, and that the response time required to adjust the metal vapor density can be shortened if such method is applied. Moreover, the invention makes it possible to produce metal vapor lasers using metals having a high melting point as the oscillating medium, such as iron, nickel, titanium, and cobalt. The invention can thus provide a possibility to widen the wave length range in which lasers can operate

What is claimed is:

1. A method of generating a metal vapor required for a metal vapor laser to oscillate, said method comprising the steps of:
   irradiating a localized region of a solid metal piece placed in a metal reservoir within a metal vapor laser discharge tube, from outside, through the discharge tube wall, with a condensed laser beam, whereby the irradiated region of the metal piece is heated, melted and vaporized, and
   generating a metal vapor in a new location on a surface of the metal piece by moving a focus position of a condenser optical system of the condensed laser beam where vaporization of the metal is produced.
2. The method as claimed in claim 1, in which the metal vapor density is adjusted by modifying the intensity of the irradiating laser beam, or by intermittently irradiating the metal piece.
3. The method as claimed in claim 1, in which the irradiating laser beam is concentrated to a point on the surface of the metal piece.
4. The method as claimed in claim 1, in which the irradiating laser beam is intensified when it is applied to a metal of higher melting point to be vaporized, or when a higher metal vapor density is to be achieved.

* * * * *